United States Patent [19]

Gerteis

[11] Patent Number: 5,509,612
[45] Date of Patent: Apr. 23, 1996

[54] PROCESS AND DEVICE FOR THE CONTINUOUS SHAPING OF PARTICULATE MATERIALS

[76] Inventor: Paul Gerteis, Curtibergstrasse 139, CH 8646 Wagen, Switzerland

[21] Appl. No.: 350,377

[22] Filed: Dec. 5, 1994

Related U.S. Application Data

[63] Continuation of Ser. No. 941,067, filed as PCT/CH92/00023, Feb. 4, 1992, abandoned.

[30] Foreign Application Priority Data

Feb. 11, 1991 [CH] Switzerland .................. 410/91

[51] Int. Cl.$^6$ ........................................... B02C 4/08
[52] U.S. Cl. .................... 241/101.4; 241/152.2; 241/159; 241/229; 241/234; 241/242
[58] Field of Search ........................ 241/3, 30, 69, 241/101.4, 229, 234, 235, 242, 159, 152.2, 225

[56] References Cited

U.S. PATENT DOCUMENTS

| | | | |
|---|---|---|---|
| 11,401 | 7/1854 | Ziegler | 241/159 |
| 178,186 | 11/1930 | Maxwell | 241/159 X |
| 286,520 | 10/1883 | Andrus | 241/152.2 X |
| 338,221 | 3/1886 | Eynon | 241/242 X |
| 370,553 | 9/1887 | Mendham | 241/229 X |
| 773,479 | 10/1904 | Cornell | 241/235 X |
| 1,126,416 | 1/1915 | Dierfdorff | 241/152.2 X |
| 1,181,967 | 5/1916 | Curtis et al. | 241/152.2 X |
| 1,287,571 | 12/1918 | Cowan et al. | 241/242 X |
| 1,338,845 | 5/1920 | Schultz | 241/152.2 X |
| 1,522,456 | 1/1925 | Howson | 241/159 X |
| 1,759,896 | 5/1930 | Fancel, Jr. | 241/242 |
| 1,774,318 | 8/1930 | Coomes | 241/159 X |
| 1,943,142 | 1/1934 | Peters | 241/234 X |
| 2,082,498 | 6/1937 | Kent et al. | 241/234 X |
| 2,199,191 | 4/1940 | Tour | 24/3 |
| 2,461,089 | 2/1949 | Smidth | 241/3 |
| 2,465,056 | 3/1949 | Bond | 241/242 X |
| 3,103,239 | 9/1963 | Alexander et al. | 241/101.4 X |
| 3,601,321 | 8/1971 | Barth et al. | |
| 3,897,016 | 7/1975 | Shah | 241/224 X |
| 4,161,296 | 7/1979 | Parker et al. | 241/235 X |
| 4,355,765 | 10/1982 | Parker et al. | 241/152.2 |
| 4,655,400 | 4/1987 | Erb et al. | 241/235 X |
| 4,905,917 | 3/1990 | Fetzer et al. | 241/30 |
| 5,042,728 | 8/1991 | Haque | 241/235 X |
| 5,184,779 | 2/1993 | Wolff et al. | 241/3 |
| 5,320,035 | 6/1994 | Sanchez et al. | 241/159 X |
| 5,361,995 | 11/1994 | Hostettler et al. | 241/159 X |

FOREIGN PATENT DOCUMENTS

| | | | |
|---|---|---|---|
| 84602 | 11/1920 | Germany | 241/159 |
| 544184 | 2/1932 | Germany . | |
| 596553 | 5/1934 | Germany | 241/229 |
| 633253 | 7/1936 | Germany . | |
| 1029723 | 5/1958 | Germany . | |
| 1164989 | 3/1964 | Germany . | |
| 1280544 | 10/1968 | Germany . | |
| 2734930 | 2/1978 | Germany | 241/3 |
| 24154 | of 1913 | United Kingdom | 241/234 |
| 198120 | 5/1923 | United Kingdom | 241/159 |
| 1333983 | 10/1973 | United Kingdom | 241/235 |

*Primary Examiner*—Frances Han
*Attorney, Agent, or Firm*—Michael J. Striker

[57] ABSTRACT

The device for continuous mechanical shaping of a particulate material includes a housing; a pressing roll pair forming a pressing space and enclosed in the housing; a rotating element which can be a size reduction roll or a rotor with screen insert arranged below the pressing roll pair; a mechanism for displacing the pressing roll pair together with the rotating element relative to the housing and perpendicular to a rotation axis of the rolls and a mechanism for adjustably spacing the pressing roll pair and the rotating element relative to each other and perpendicular to the rotation axis. The pressing roll pair is advantageously tiltable between 0 and 90 degrees to the horizontal. The rolls are advantageously provided with milled grooves arranged so as to be parallel and extend at an angle of from 0 to 90 degrees to an axis of rotation.

11 Claims, 3 Drawing Sheets

PROCESS AND DEVICE FOR THE CONTINUOUS SHAPING OF PARTICULATE MATERIALS

This is a continuation of application Ser. No. 07/941,067, filed as PCT/CH92/00023, Feb. 4, 1992, now abandoned.

BACKGROUND OF THE INVENTION

The invention is directed to a process for the continuous mechanical shaping of particulate materials and to a device for carrying out the process.

Mechanical shaping of materials refers to the pressing of fine, powdery, dustlike products of wide-ranging grain size or of mixtures of such products to form coarse molded articles in the shape of briquettes or as continuous ribbon-shaped pressed articles, also called shells or scabs, and to the simultaneous crushing of such articles to form free-flowing granules.

Roller presses of various constructions are known. They have two oppositely running rolls between which the powderlike products are pressed to form briquettes or scabs. If the desired shape of the end product is briquettes, the latter are separated from the fine portion and used as such. If free-flowing grainy granules are desired, e.g. as required in the pharmaceutical industry for charging tablet compressing mechanisms, the scabs are pre-crushed on different units connected subsequent to the roller press, such as so-called thumb breakers. In an additional apparatus, e.g. a hammer mill or a friction mill with rotating or oscillating rotary movements, the material passes through a perforated plate or other sieve insert and is reduced in this manner to a grain size with a fixed maximum.

The fine portions occurring in this process must be separated from the product grain in an additional work step by means of a sieve device. A return of these fine portions to the feed end of the roller press is undesirable when processing mixtures of different components and quantity proportions, particularly in the pharmaceutical industry. There is no longer a guarantee that the composition of the final product will be free of defects.

The known roller presses have two fundamental different arrangements with respect to the pressing rolls:

1. The rolls are arranged in a vertical axis relative to one another, charging is effected by a stuffing device situated in the horizontal axis, usually in the form of screw conveyors.
2. The rolls are arranged next to one another on the vertical axis, the stuffing device lies in a vertical axis relative to the latter, likewise in the form of a screw conveyor or as a feed hopper which enables a direct inlet of the feed material to the pressing zone of the roller press due to static superposition.

In all of the known variants, the scab ribbons must be reduced in size at the roller press subsequently by one or more additional grinding and sieve devices. These apparatuses can only be disassembled at great cost for cleaning, which makes them substantially difficult to use.

The arrangement of the pressing rolls one above the other has the disadvantage that a considerably poorer distribution of the powder along the entire width of the pressing roll must be taken into account due to the omission of the charging due to gravitational force. As a result, sufficient powder is fed to and compressed in the center of the rolls, but the peripheries of the rolls are usually charged much less. Practically no scab can form in these peripheral areas. The fine material together with the fine portion which results from the reduction in size must be sieved out and is considered as waste in many cases.

Although arranging the pressing rolls adjacent to one another has the advantage that a better charging is ensured along the entire width of the roll in the case of free flowing material, it has the disadvantage that the force of gravity alone causes the fine portions to "shoot through". This is particularly true in constructions of roller presses which work with a fixed roll gap. Large amounts flow through the gap into the subsequent machines without being compressed just when starting the press before a sufficiently high resistance is built up between the pressing rolls. As soon as the fed product quantity changes only slightly as the forward pressure in the proportioning container decreases due to the decreasing contents, the degree of compression and accordingly the hardness of the briquette or scabs also changes. After the size reduction and further processing, e.g. into tablets, the hardness of the tablets and accordingly the release of the active ingredient of the medication also changes.

All known roller press constructions have another substantial disadvantage which is an obstacle to their use in the pharmaceutical and foodstuff industries and in other applications.

The pressing rolls of these roller presses are supported at both sides because of their construction and can only be disassembled and cleaned at immense cost and by trained mechanics.

SUMMARY OF THE INVENTION

The object of the invention is to provide a process allowing the economical manufacture of an extensively dust-free, compressed homogeneous product in a desired shape.

Another object is to provide a device capable of continuous compacting of particulate products and economical shaping of the product as desired.

Another object is to provide a device whose individual parts which contact the product are easily removed and can be disassembled into individual parts for cleaning according to the guidelines of the pharmaceutical industry and checked for cleanliness in their entirety.

The object is met according to the invention in that the particulate materials are compacted and simultaneously further reduced in volume without creating dust.

Compacting means briquetting, compressing, pelletizing and granulating powderlike, granular, pasty and slurried products. Reduction in volume refers also to size reduction and the production of a determined grain size to which the compacted product is further compressed and reduced.

A reduction in size of this type also refers to grinding with subsequent grading.

The process according to the invention has the advantage that the material is compressed between the pressing rolls and any desired grain size of the product can be adjusted between the roll of the pressing roll pair and the third roll.

However, it may also be advisable to reduce the volume of the compacted particles further by subsequent compression.

Surprisingly, an arrangement of three rolls has proven successful as a device for carrying out the process, the third roll being arranged in a closed space below the pressing roll pair.

It is advisable to arrange the pressing roll pair and the third roll in such a way that the rolls of the pressing roll pair are movably supported and arranged so as to be displaceable relative to the housing and in its entirety. However, it is also possible to arrange one roll so as to be stationary and the other so as to be displaceable relative to the latter in the vertical and horizontal directions and to arrange the third roll horizontally and vertically relative to each roll of the roll pair. It is accordingly possible to adapt to a wide range of different products.

In one variant it is also possible, instead of a third roll, to provide a rotor, preferably a rod rotor, with a sieve insert. In so doing the rotor together with the sieve insert which brushes over it takes over the function of reduction to a desired grain size.

It is advisable to arrange the pressing roll pair so as to be tiltable out of the horizontal at an angle between 0 and 90 degrees. This has the advantage that the product can be conveyed in a continuous manner depending on its flow property.

It is advisable to provide the pressing rolls and/or the third roll with an attachable cooling or heating device. This allows a quick adaptation to the processing of a product with other rheological characteristics as needed.

The surface of the rolls can be shaped in various ways. Profiled pressing rings can be attached to a carrier for simpler handling. When using pressing rings they can be exchanged without removing the roll cooling means.

The surface, particularly the third roll and pressing rings, respectively, can be provided with milled grooves which are arranged parallel to one another and extend at an angle greater than 0 and less than 90 degrees, particularly between 5 and 45 degrees, preferably between 5 and 20 degrees.

However, the milled grooves (depressions) can accordingly run diagonally relative to the axis and in a double crossing construction. However, they can also be constructed in such a way that the flanks of the milled grooves have angles of equal or different slope as seen with reference to the center axis.

The milled grooves can also have different depths.

In another variant, a stripper can be provided which is adjustable in a continuous manner relative to the roll surface by adjusting screws. The strippers can be used to avoid double pressings of products which may possibly adhere. The distance between the stripper edge and a roll surface is automatically adjustable in a continuous manner by adjusting screws in such a way that there is no metallic contact with the roll surface during efficient stripping. It is advantageous to construct the strippers in such a way that they are rotatable by 180°. It is also possible to construct the stripper in such a way that it can receive a sieve insert.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
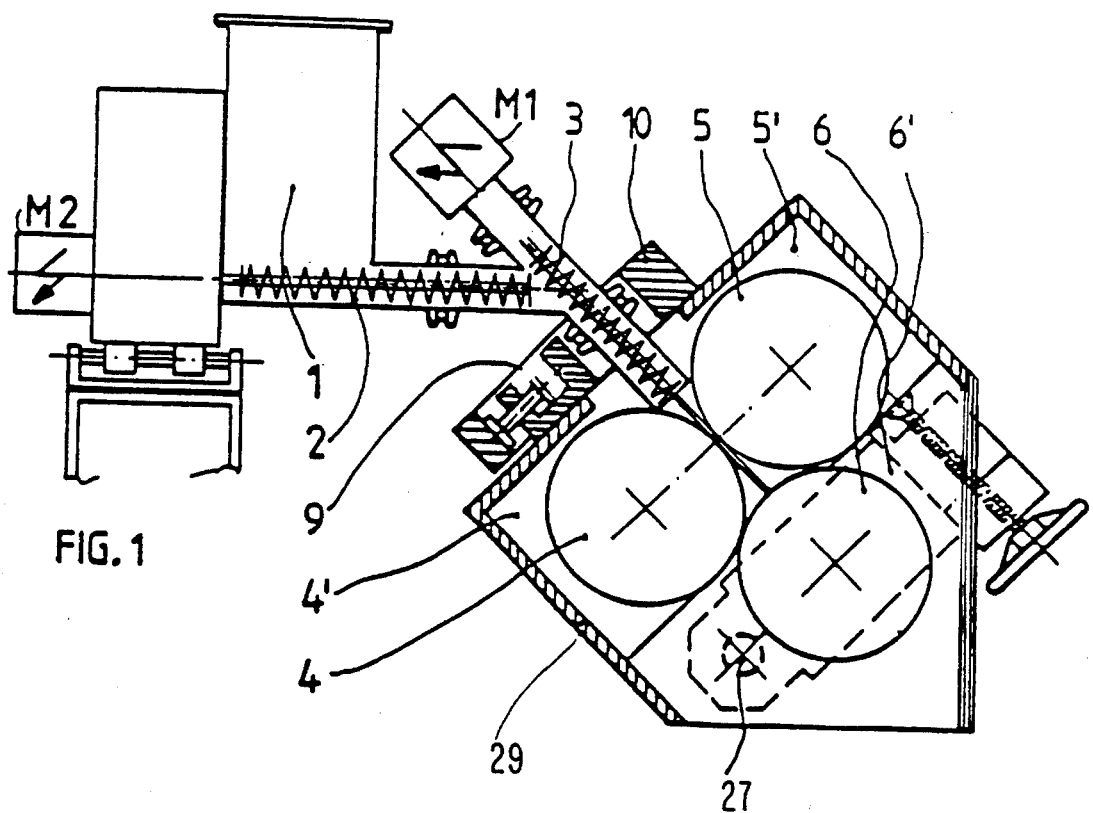
FIG. 1 shows a section through the device according to the invention.

A proportioning device is designated by reference number 1 in FIG. 1. The proportioning device 1 is connected with a proportioning screw 2, which can be regulated, and a stuffing screw 3. A pressing space is formed between a pressing roll 4 and a pressing roll 5. A third roll 6 is located below the pressing roll pair 4, 5. All rolls are enclosed by a supported housing 4', 5' and by a housing 29

A pressure cylinder 9 is fastened on the housing 4' of the roll support and can be constructed as a hydraulic cylinder. The pressure cylinder 9 is connected in a known manner via a tension clip 10 with the housing 4',5' supported on a rocker, not shown, and is capable of displacing the pressing rolls 4, 5 relative to one another. A drive M1, M2 is provided for each screw 2 and 3.

Figure 2:
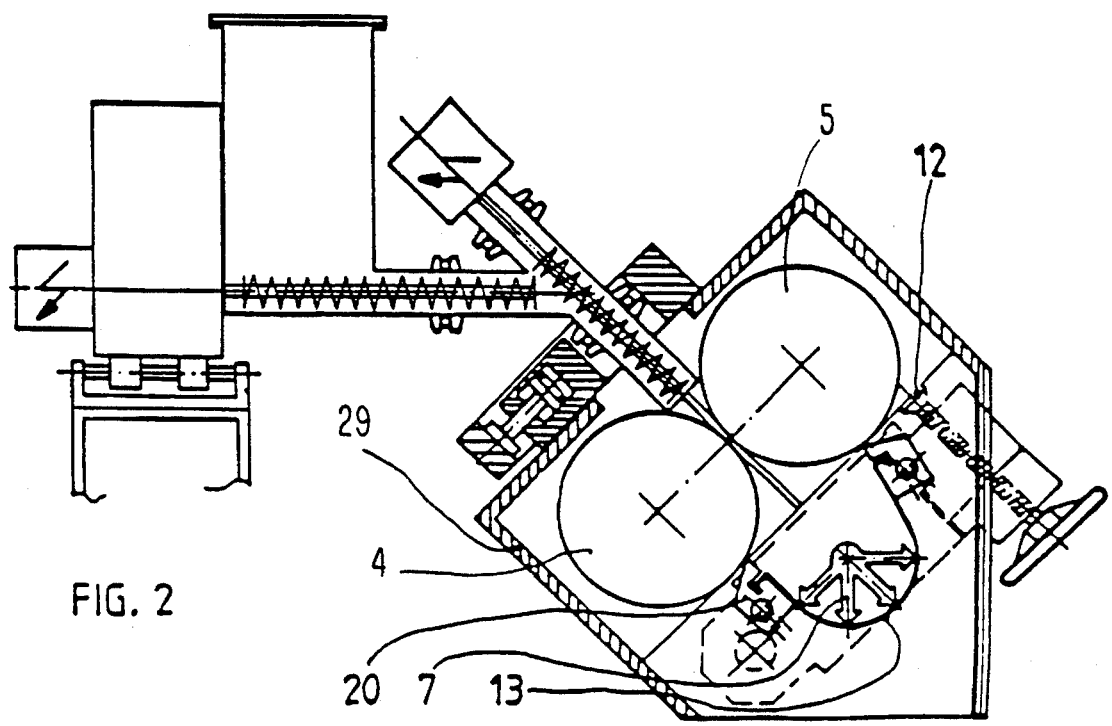
FIG. 2 shows a section through a variant of the device according to the invention.

FIG. 2 shows a variant in which a rotor 7 is provided instead of the roll 6 of FIG. 1, the rotor 7 being arranged in such a way that it can brush over a sieve arrangement 13.

Figure 3:
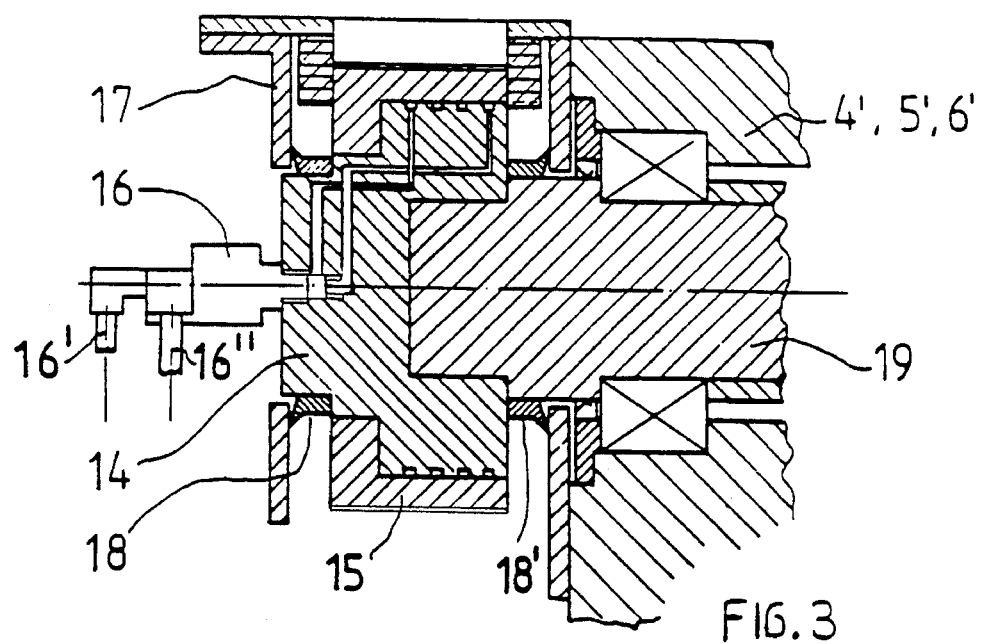
FIG. 3 shows a section through a roll cooling/heating unit.

FIG. 3 shows an attachable cooling/heating unit for the pressing rolls 4, 5 and/or the size reduction roll 6. This unit includes a roll carrier 14 which is enclosed by an exchangeable pressing ring 15. The roll cooling means 16 includes a hollow body with a connection 16' for the inlet and a connection 16" for the outlet of a cooling/heating medium. A sealing ring 18 is provided between a swivelable front wall 17 and the roll carrier 14. Another sealing ring 18' is provided between the roll carrier 14 and the back wall of the housing. The sealing rings 18, 18' ensure a hermetic closure between the product-guiding space and the mechanical machine parts.

Figures 3A, 3B, 3C:
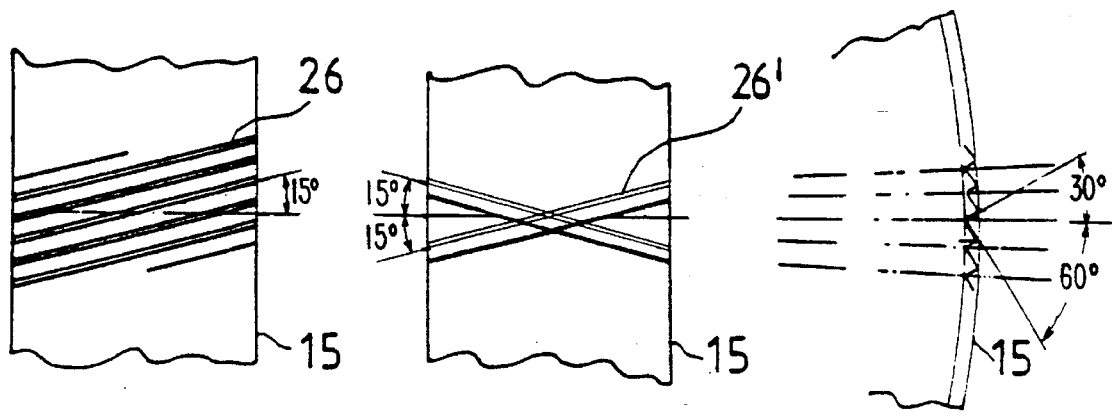
FIGS. 3A–3D show surfaces of the rolls and the pressing rings which can be attached to the roll carrier.

In FIG. 3A the surface of the pressing ring 15 is provided with milled grooves 26 which extend parallel to the axis of rotation at an angle of 15 degrees.

FIG. 3B shows the surface of the pressing ring 15 with intersecting parallel milled grooves 26' which have an intersection angle of 15 degrees.

FIG. 3C shows the surface of a pressing ring 15 with different flank angles.

Figure 3D:
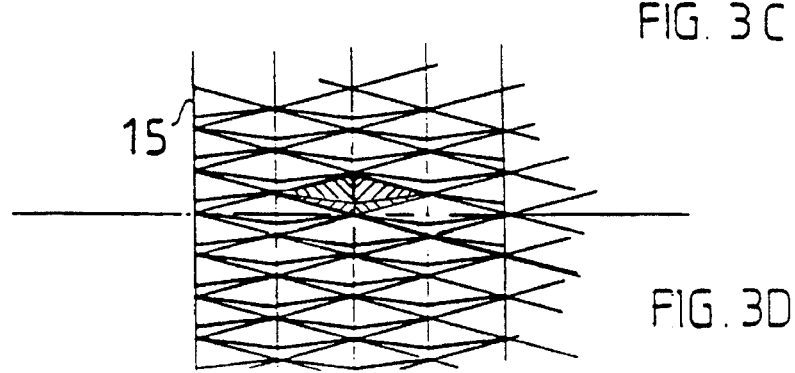

FIG. 3D shows the teeth formed in the intersecting arrangement of the milled grooves 26' with different flank angles in detail.

The surfaces of the rolls 4, 5, 6 can be designed so as to be identical to those of the exchangeable pressing rings.

Figure 4:
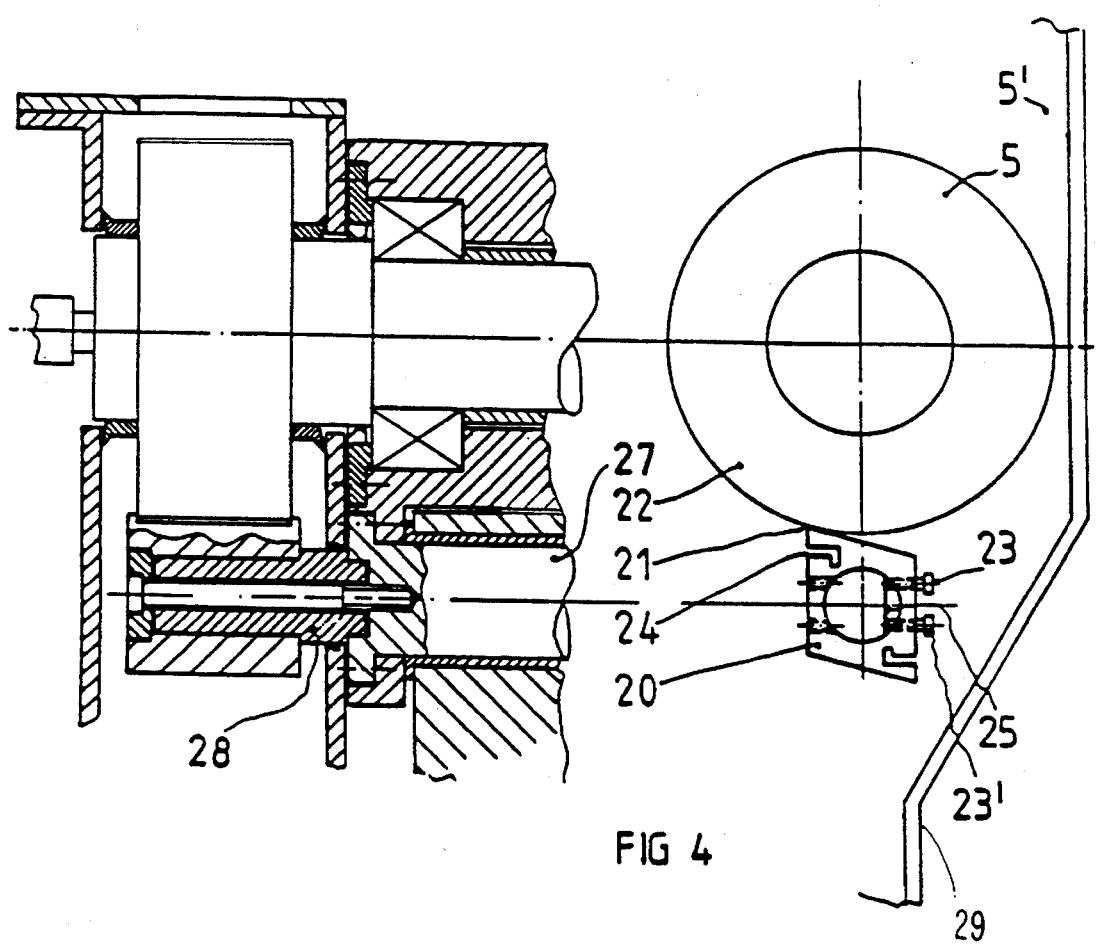
FIG. 4 shows a cross section of a stripper.

Like FIG. 3, FIG. 4 shows a partial section through the housing 5' and 6' as well as the respective swivel axis 27 which first allows a relative displacement of the housings. A stripper 20 is attached to a pin 28 in the lengthening of the swivel axis 27. The stripper 20 has an edge 21 which strips the surface of the roll 5. The stripper 20 and the roll 5 are surrounded by a housing part 29. The stripper 20 is provided with adjusting screws 23, 23' which act on an adjusting surface 25. A cut out portion 24 is provided for suspending a sieve insert 13. The adjusted gap between the surface of the roll 5 and the edge 21 of the stripper 20 remains constant as a result of the rigid connection of the swivel axis 27 and the pin 28 with the housing 5', even when the housing 5' moves.

Powder or a mixture of different powders is conveyed from the proportioning device 1 into the stuffing screw 3 during operation by the proportioning screw 2 which can be regulated. The stuffing screw 3 takes over the powder and conveys it into the pressing space of the pressing rolls 4 and 5 which run against one another. The hydraulic cylinder 9 is fastened to the stationary housing 4', acted upon by pressure, and draws the pressing rolls 4 and 5 toward one another via a tension stirrup 10 fastened on the rocker of the movably supported housing 5'. The powder is aerated between the rolls and compressed to form a scab.

Another roll 6 whose purpose consists in further reducing the size of the shaped scab is located below the two pressing rolls 4 and 5.

While the pressing rolls 4 and 5 run synchronously at the same speed, the speed of the roll 6 is different from that of the roll 4, i.e. a friction is adjusted. Due to the diagonal arrangement of the pressing rolls 4 and 5 the scab shaped between the latter is drawn in automatically by the next roll pair 4 and 6 and reduced to the desired grain size due to the friction, the special roll surface, and the adjustable distance between the rolls 4 and 6.

To produce highly-compressed briquettes the pre-shaped briquette, instead of a scab, is compressed again after the first time pressure is relieved. The pressing rolls 4, 5 and 6 now run synchronously at the same speed, i.e. no friction is adjusted. As a result of the diagonal arrangement of the pressing roll pair 4, 5 the briquette is automatically drawn in by the resulting second roll pair 4, 6. Due to the prevailing pressing force between the two rolls 4, 6 a pressing is effected a second time at a higher force than in the pre-pressing. Since the roll 6, like the roll 5, is movably supported in a rocker a higher compression can also be achieved in that the roll gap between the roll pair 4 and 6 is adjusted so as to be smaller than during the pre-pressing between the roll pair 4 and 5. In addition to this option, the roll 6 is also acted upon e.g. by hydraulic force in the same way as the movable pressing roll.

When using a rod rotor 7 with sieve insert 13 instead of the roll 6, the rod rotor 7 rotates relative to the sieve insert 13. Due to the resulting acute angles between the rotor rods and the sieve insert 13 and the revolving or oscillating movement of the rotor the scabs are reduced in size by squeezing and are pressed through the mesh of the sieve insert 13.

The roll surfaces are provided with milled grooves which extend transversely along the roll. They are milled at an angle of 15 degrees for the pairing of the rolls carrying out the size reduction, which can be varied depending on the nature of the product and the grinding results.

With respect to the roll 6, it has been shown that the best results with respect to the yield of granulated material are achieved when the milling is carried out twice, specifically once at a positive angle and once at a negative angle. Individual teeth whose self-cleaning effect is particularly pronounced are formed at the circumference of the grinding roll 6 when the milled grooves are suitably spaced.

The shape of the milled groove extending diagonally along the rolls in this way likewise has a particular shape resembling that of a saw blade, i.e. there is a cut edge having a substantially steeper angle toward the axial center than the shoulder which is constructed so as to be substantially flatter.

The simple construction of the exchangeable pressing rings makes it economical to use constructions with different angles for different types of product because the yield can be optimized in this way.

With the device according to the invention it is possible to impart the desired shape to all of the above-mentioned products uniformly regardless of their consistency without the need for additional work steps such as grinding and sieving and the resulting waste of fine portions. It is also possible to work in an environmentally sound manner.

With the device according to the invention and due to the special arrangement it is possible for the first time to compress briquettes of particularly high density.

It will be understood that each of the elements described above, or two or more together, may also find a useful application in other types of constructions and methods differing from the types described above.

While the invention has been illustrated and described as embodied in a process and device for the continuous shaping of particulate materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for continuous mechanical shaping of a particulate material comprising a housing; a pressing roll pair forming a pressing space and enclosed in said housing, said pressing roll pair consisting of two pressing rolls, each of said pressing rolls having a rotation axis; a rotating element arranged in said housing adjacent said pressing roll pair and below said pressing roll pair; means for moving said pressing roll pair together with said rotating element relative said housing and perpendicular to one of the rotation axes of said pressing rolls and means for adjustably spacing said pressing roll pair and rotating element relative to each other and in a direction perpendicular to said rotation axis of said pressing rolls.

2. A device as defined in claim 1, wherein said rotating element is a size reduction roll.

3. A device as defined in claim 2, wherein said pressing roll pair and said size reduction roll are provided with temperature changing means for changing a temperature of said pressing roll pair and said size reduction roll.

4. A device as defined in claim 3, wherein said temperature changing means is an attachable cooling device.

5. A device as defined in claim 3, wherein said temperature changing means is an attachable heating device.

6. A device as defined in claim 2, wherein each of said rolls has milled grooves arranged parallel to each other and extending at an angle of greater than 0 degree and less than 90 degrees with respect to said rotation axis of said rolls.

7. A device as defined in claim 6, wherein said milled grooves have different depths and flank angles.

8. A device as defined in claim 2, wherein each of said rolls has two separate groups of milled grooves, the milled grooves of each of said separate groups being arranged parallel to each other and extending at an angle of greater than 0 degree and less than 90 degrees with respect to said rotation axis of said rolls and said milled grooves of one of said two separate groups intersecting said milled grooves of another of said two separate groups at another angle of greater than zero degree and less than 90 degrees.

9. A device as defined in claim 1; and further comprising a stripper having an edge engagable with a surface of at least one of said pressing rolls for stripping said surface and means for adjusting a position of said edge in a continuous manner relative to said surface.

10. A device for continuous mechanical shaping of a particulate material comprising a housing; a pressing roll pair forming a pressing space and enclosed in said housing, said pressing roll pair consisting of two pressing rolls, each of said pressing rolls having a rotation axis; a rotating element arranged in said housing adjacent said pressing roll pair and below said pressing roll pair; means for moving said pressing roll pair together with said rotating element relative to said housing and perpendicular to one of the rotation axes of said pressing rolls; means for adjustably spacing said pressing roll pair and said rotating element relative to each other and in a direction perpendicular to said rotation axis of said pressing rolls and a sieve insert mounted in said housing adjacent said rotating element and wherein said rotating element is a rotor.

11. A device for continuous mechanical shaping of a particulate material comprising a housing; a pressing roll pair forming a pressing space and enclosed in said housing, said pressing roll pair consisting of two pressing rolls, each of said pressing rolls having a rotation axis; a rotating element arranged in said housing adjacent said pressing roll pair and below said pressing roll pair; means for moving said pressing roll pair together with said rotating element relative to said housing and perpendicular to one of the rotation axes of said pressing rolls; means for adjustably spacing said pressing roll pair and said rotating element relative to each other and in a direction perpendicular to said rotation axis of said pressing rolls and means for tilting said pressing roll pair from a horizontal to an angle more than 0 degree and less than 90 degrees to said horizontal.

* * * * *